Jan. 1, 1952 R. B. DOME 2,581,177

FREQUENCY CONVERSION SYSTEM FOR SUPERHETERODYNE RADIO RECEIVERS

Filed May 11, 1948

Inventor:
Robert B. Dome,
by Merton D. Moore
His Attorney.

Patented Jan. 1, 1952 2,581,177

UNITED STATES PATENT OFFICE 2,581,177

FREQUENCY CONVERSION SYSTEM FOR SUPERHETERODYNE RADIO RECEIVERS

Robert B. Dome, Geddes Township, Onondaga County, N. Y., assignor to General Electric Company, a corporation of New York Application May 11, 1948, Serial No. 26,251

5 Claims. (Cl. 250—20)

The present invention relates to superheterodyne receivers and more particularly to radio-frequency signal and local oscillator tuning circuits employed in receivers of the heterodyne type.

One object of my invention is to provide a new and improved means of tuning the radio-frequency signal circuit and local oscillator of a superheterodyne receiver whereby the necessity of providing gang tuning sections for maintaining tracking is eliminated.

Another object of my invention is to provide a new and improved means for lower cost construction of a more compact superheterodyne receiver in which a loop antenna may be employed and band switching accomplished.

Briefly, the objects of my invention are achieved with but a single variable circuit element in the form of a tuning coil the inductance of which is varied to effect tuning of both a radio-frequency signal circuit and a local oscillator.

Figure 2:
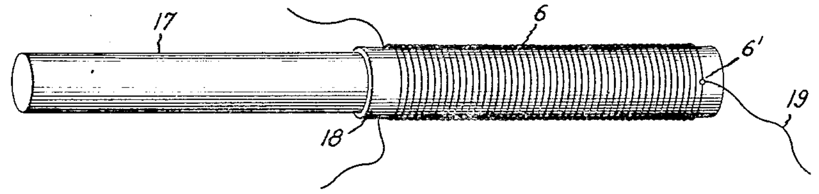
Figure 3:
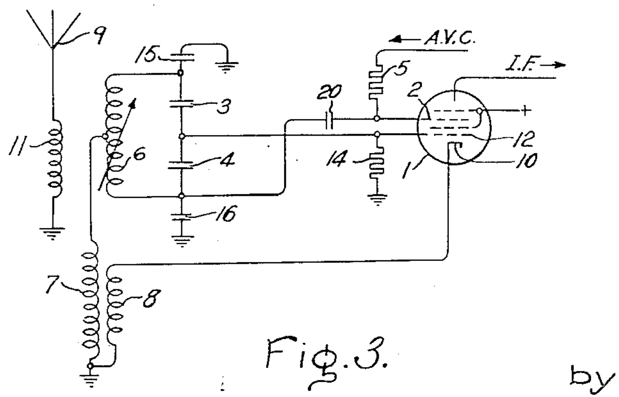

The features that I desire to protect herein are pointed out with particularity in the appended claims. The invention itself, together with further objects and advantages thereof, may best be understood by reference to the following description taken in connection with the accompanying drawing in which Fig. 1 is a schematic wiring diagram of a portion of a superheterodyne radio receiver circuit embodying the invention, Fig. 2 is a perspective view of a preferred form of variable inductance coil as used in the invention, and Fig. 3 is a modification of the circuit of Fig. 1.

Figure 1:
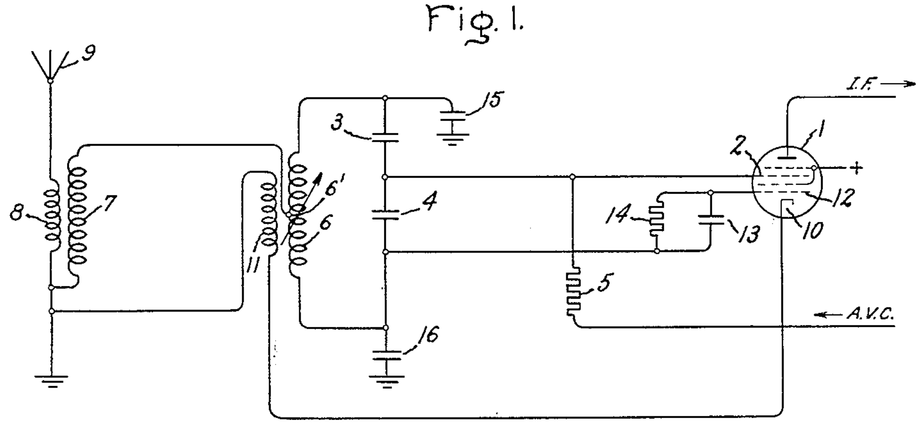

Fig. 1 illustrates the radio-frequency and local oscillator circuits of a superheterodyne receiver employing the invention and having an oscillator-converter tube 1 with its signal grid 2 connected to the junction between two capacitors 3 and 4 of equal capacitance. A grid leak resistor 5 is connected from the signal grid 2 to a source of grid bias potential (not shown) or alternatively to a source of automatic volume control voltage. The outer extremes of capacitors 3 and 4 are connected across the outer extremes of a variable inductance coil 6. Coil 6 is provided with a center-tap 6′ which is connected to ground through a fixed inductance 7 which comprises the secondary winding of an antenna transformer. The primary winding 8 of the antenna transformer is connected between an antenna 9 and ground and is coupled magnetically to coil 7. The cathode 10 of tube 1 is connected to ground through a tickler coil 11 which is coupled magnetically to coil 6. The oscillator or first grid 12 of tube 1 is connected to one end of coil 6 through a grid blocking capacitor 13. A grid leak resistor 14 is connected in parallel with capacitor 13. Balancing capacitors 15 and 16 are connected respectively between one end of coil 6 to ground. By properly selecting the values of capacitors 15 and 16 a minimum amount of oscillator voltage may be obtained across inductance coil 7. The tuned or resonant frequency of the radio-frequency signal circuit is determined by the total effective shunt capacitance to ground, including the capacity of capacitors 15 and 16 in parallel with each other and with the stray shunt capacities of the circuits, resonating with the inductance of coil 7 in series with the leakage inductance of coil 6. Only the leakage inductance of coil 6 is effective, so far as the signal grid 2 is concerned, because the radio frequency currents flow in opposite directions through the two halves of coil 6, effectively cancelling out the mutual inductance.

Let the frequency of an incoming signal be designated $f_s$. Thus, approximately, $$f_s=\frac{1}{2\pi\sqrt{(L_7+aL_6)(C_{15}+C_{16}+C_{gnd})}} \qquad (1)$$

where $a$ is the coefficient of leakage inductance of coil 6. The oscilaltor frequency is determined by the total inductance of coil 6, i. e. including the mutual inductance between the two halves of coil 6, resonating with the capacitance of capacitors 3 and 4 in series in parallel with capacitors 15 and 16 in series. Indicating the oscillator frequency by $f_o$, $$f_o=\frac{1}{2\pi\sqrt{L_6\left(\frac{C_3C_4}{C_3+C_4}+\frac{C_{15}C_{16}}{C_{15}+C_{16}}\right)}} \qquad (2)$$

The only variable in either equation is the single tuning element $L_6$. Equation 1 may be rewritten as $$f_s=\frac{K_1}{\sqrt{K_2+ax}} \qquad (3)$$

and Equation 2 may be rewritten as $$f_o=\frac{K_3}{\sqrt{x}} \qquad (4)$$

It is evident that for a given change in $x$, Equation 4 changes faster than Equation 3. Hence, by properly choosing values for $a$, $K_1$, $K_2$, and $K_3$, which is merely a proper choice of circuit constants by one skilled in the art, tracking can be achieved. For example, let $K_1=1$, $K_3=0.615$, $K_2=1$, $a=1$. Then, if $x=4$, $$f_s=0.450 \text{ and } f_o=0.307$$

and $$f_s-f_o=0.143 \quad (5)$$

Tuning the coil so that $x=2$ instead of 4, then $$f_s=0.577 \text{ and } f_o=0.434$$

and $$f_s-f_o=0.143 \quad (6)$$

Since (5) and (6) agree, tracking is indicated at these two points. Calculation will readily show that tracking is also achieved within commercially-acceptable limits for all intermediate points.

Assuming the values for $f_s$ and $f_o$ in the example above are multiplied by one million, the receiver may be tuned from 450 kc. to 577 kc. and the oscillator from 307 kc. to 434 kc., the intermediate frequency being 143 kc.

These values are by way of numerical example only and are not intended to demonstrate the values which would necessarily be used in actual practice by those skilled in the art.

In circuits in which a loop antenna is substituted for coil 7, coil 8 and antenna 9 are not required.

In order for the oscillator to operate at a frequency greater than the signal frequency, the connections are as shown in Fig. 3 in which coil 8 is the tickler and coil 11 the antenna primary coil. Likewise, the connections to grids 2 and 12 are reversed. Grid leak 14 returns to ground directly and a blocking condenser 20 is inserted between grid 2 and the junction between coil 6 and condenser 4. Equations 1 and 3 then become equations for $f_o$, and Equations 2 and 4 equations for $f_s$. Thus, in the example give above, the receiver of Fig. 3 tunes from 307 kc. to 434 kc. and the oscillator from 450 kc. to 577 kc., the intermediate frequency remaining substantially constant at 143 kc.

It will thus be observed that in Fig. 1, so far as the signal input grid 2 is concerned, the leakage inductance of coil 6, plus any input circuit inductance, is tuned by the total capacity between each end of coil 6 and ground (assuming proper circuit balance). So far as the oscillator grid 12 is concerned, the total inductance of coil 6 is tuned by the total capacity across its two ends, comprising capacitors 3 and 4 in series, shunted by capacitors 15 and 16, plus any other stray shunt capacities. Thus, the signal input circuit resonates at a higher frequency than the oscillator circuit. In Fig. 3, on the other hand, the circuit relations are exactly transposed with respect to the two grids, so that the oscillator operates at the higher frequency.

Fig. 2 shows the variable tuning coil 6 as being of the permeability tuned type having a movable iron core 17 partially inserted therein. The symmetrical wiring design of coil 6 may be formed by starting the winding at one end of a tube 18 and winding a single layer of turns to the other end of the tube, forming the center-tap connection 19, and then winding from the center-tap 19 back over the first layer to the starting end of the tube to complete the winding. The tube 18 preferably comprises a heavy paper or other suitable insulating material. The sliding ferromagnetic core 17 may be inserted in the tube to effect simultaneous tuning and tracking of the signal and oscillator circuits as previously described.

While particular embodiments of the present invention have been described, it will be understood that numerous modifications may be made by those skilled in the art without actually departing from the invention. I therefore aim in the appended claims to cover all such equivalent variations that come within the true spirit and scope of the foregoing disclosure.

What I claim as new and desire to secure by Letters Patent of the United States is:

1. A frequency conversion system comprising a source of input signals, an oscillator and mixer electron discharge device means with a signal grid and an oscillator grid, a resonant circuit comprising a center-tapped inductance shunted by two capacitors in series, one of said grids being connected to one end of said inductance and the other to the junction of said capacitors, first input means connected to impress voltages between said center tap and a point of fixed reference potential, capacitive means connected between each end of said inductance and said point for balancing the alternating potentials with respect to said point, second input means connected to impress voltages across both halves of said inductance in series, one of said input means being energized from said source and the other from the output of said oscillator means, and tuning means for symmetrically adjusting the inductances of both halves of said inductance in unison.

2. In a superheterodyne conversion system for a radio receiver, a source of input signals, an oscillator-mixer electron discharge device means having a signal input grid and a control grid, a frequency-determining tank circuit comprising a center-tapped inductance shunted by two series capacitors of susbtantially equal values and further comprising a pair of substantially equal balancing capacities respectively connected between each end of said inductance and a reference point, one of said grids being connected to one end of said inductance and the other to the junction of said series capacitors, a first input means connected to impress voltages between said center tap and said point, thereby to cause balanced currents to flow through the two halves of said inductance in opposite directions, a second input means connected to impress voltages across both halves of said inductance in the same directions, one of said input means being energized from said input source and the other from the oscillator output, and means comprising a movable magnetic core within said inductance for symmetrically varying the inductance of both halves of said inductance in unison, thereby simultaneously to tune said oscillator-mixer means over different, spaced frequency ranges.

3. A frequency conversion circuit comprising a source of alternating input signals, an oscillator-mixer tube including a signal grid, as oscillator grid and a cathode, a resonant tank circuit comprising an inductance shunted by a pair of substantially equal capacitors in series and further comprising a pair of substantially equal balancing capacities respectively connected between each end of said inductance and ground, said grids being connected respectively to opposite terminals of one of said capacitors, coupling means comprising an oscillator feed-back coil connected between said cathode and ground for regeneratively coupling energy to said inductance for generation of oscillations, coupling means also coupling said signal source to said inductance, said coupling means both being arranged to impress equal voltages on both halves of said inductance but in aiding phase and in opposing phase respectively, and permeability tuning means for simultaneously varying the inductances of both halves of said inductance in the same direction, thereby to tune said oscillator-mixer over a tracking range.

4. A frequency conversion system for a superheterodyne radio receiver comprising an oscillator-mixer tube including an output anode, a signal injection grid, an oscillator anode electrode, an oscillator grid and a cathode, a tunable tank circuit comprising a center-tapped inductance shunted by a pair of substantially equal capacitors in series and further comprising a pair of substantially equal balancing capacities respectively connected between each end of said inductance and ground, an input signal source arranged to impress signal-modulated carrier waves on the two halves of said inductance in parallel, said soure being connected between said center tap and ground, a circuit connection from the adjacent terminals of said series capacitors to said signal injection grid, a circuit connection from the other terminal of one of said capacitors to said oscillator grid, an oscillator output circuit for regeneratively feeding back energy therefrom to the two halves of said inductance in push-pull, said oscillator output circuit comprising a feedback coil magnetically coupled to said inductance and connected in circuit between said anode electrode and said cathode, and means comprising a single, movable, magnetic core for symmetrically varying the inductances of both halves of said inductance, thereby to tune said oscillator-mixer over a tracking range.

5. A frequency conversion system for a superheterodyne radio receiver comprising an oscillator-mixer tube including an output anode, a signal injection grid, an oscillator anode electrode, an oscillator grid and a cathode, a tunable tank circuit comprising a center-tapped inductance shunted by a pair of substantially equal capacitors in series and further comprising a pair of substantially equal balancing capacities respectively connected between each end of said inductance and ground, an input signal source arranged to impress signal-modulated carrier waves on the two halves of said inductance in push-pull, said source comprising a winding magnetically coupled to said inductance, a circuit connection from the adjacent terminals of said series capacitors to said oscillator grid, a circuit connection from the other terminal of one of said capacitors to said signal injection grid, an oscillator output circuit for regeneratively feeding back energy therefrom to the two halves of said inductance in parallel, said oscillator output circuit comprising a transformer having a primary winding in circuit between said anode electrode and said cathode and a secondary winding in circuit between said center-tap and ground, and means comprising a single, movable, magnetic core for symmetrically varying the inductances of both halves of said inductance, thereby to tune said oscillator-mixer over a tracking range.

ROBERT B. DOME.

REFERENCES CITED

The following references are of record in the file of this patent:

UNITED STATES PATENTS

| Number | Name | Date |
|---|---|---|
| 1,794,708 | Nozieres | Mar. 3, 1931 |
| 1,818,157 | Phillips | Aug. 11, 1931 |
| 1,949,842 | Rechnitzer | Mar. 6, 1934 |
| 1,972,189 | Gottschalk | Sept. 4, 1934 |
| 1,997,393 | Roberts | Apr. 9, 1935 |
| 2,052,880 | Keefer | Sept. 1, 1936 |
| 2,359,684 | Sands | Oct. 3, 1944 |
| 2,486,986 | Sands | Nov. 1, 1949 |

FOREIGN PATENTS

| Number | Country | Date |
|---|---|---|
| 720,342 | France | Feb. 18, 1932 |